US008458513B2

(12) United States Patent
Wylie et al.

(10) Patent No.: US 8,458,513 B2
(45) Date of Patent: Jun. 4, 2013

(54) EFFICIENT FAILURE RECOVERY IN A DISTRIBUTED DATA STORAGE SYSTEM

(75) Inventors: John J. Wylie, San Francisco, CA (US);
Joseph A. Tucek, Palo Alto, CA (US);
Eric A. Anderson, Palo Alto, CA (US);
Xiaozhou Li, Cupertino, CA (US);
Mustafa Uysal, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 336 days.

(21) Appl. No.: 12/847,203

(22) Filed: Jul. 30, 2010

(65) Prior Publication Data
US 2012/0030511 A1 Feb. 2, 2012

(51) Int. Cl.
*G06F 11/00* (2006.01)
(52) U.S. Cl.
USPC .......................................... 714/6.1
(58) Field of Classification Search
USPC .............. 714/6.1, 6.2, 6.22, 6.24, 6.3, 6.31, 714/42, 54, 55, 752, 770; 711/114
See application file for complete search history.

(56) References Cited

U.S. PATENT DOCUMENTS

| 5,278,838 | A | 1/1994 | Ng |
| 7,103,824 | B2 | 9/2006 | Halford |
| 7,266,716 | B2 | 9/2007 | Frolund et al. |
| 7,650,529 | B2 | 1/2010 | Fan et al. |
| 7,681,104 | B1 * | 3/2010 | Sim-Tang et al. ............ 714/763 |
| 7,681,105 | B1 * | 3/2010 | Sim-Tang et al. ............ 714/763 |
| 7,873,878 | B2 | 1/2011 | Belluomini |
| 8,006,125 | B1 | 8/2011 | Meng |
| 2006/0075288 | A1 | 4/2006 | Forrer |
| 2007/0179993 | A1 | 8/2007 | Arruza |
| 2008/0198752 | A1 | 8/2008 | Fan et al. |
| 2008/0253283 | A1 | 10/2008 | Douglis et al. |
| 2008/0307255 | A1 | 12/2008 | Chen |
| 2009/0204768 | A1 | 8/2009 | Bruening |
| 2010/0005151 | A1 | 1/2010 | Gokhale |
| 2010/0037056 | A1 | 2/2010 | Follis et al. |

OTHER PUBLICATIONS

John MacCormick et al., "Kinesis: A New Approach to Replica Placement in Distributed Storage Systems", ACM Transactions on Storage, vol. 4, No. 4, Article 11, Publication date: Jan. 2009, pp. 11:1-11:28.
Eric A. Anderson, U.S. Appl. No. 12/687,361, entitled "Scrubbing Procedure for a Data Storage System", filed Jan. 14, 2010.
Hewlett-Packard Development Company, L.P., PCT Application No. PCT/US2010/020972, entitled "Recovery Procedure for a Data Storage System", filed Jan. 14, 2010.
Eric A. Anderson, "Efficient eventual consistency in Pahoehoe, an erasure-coded key-blob archive", Proceedings of DSN 2010, The 40th Annual IEEE/IFIP International Conference on Dependable Systems and Networks, Jun. 28-Jul. 1, 2010, Chicago Illinois USA, 10 pages.

* cited by examiner

*Primary Examiner* — Scott Baderman
*Assistant Examiner* — Joseph Kudirka

(57) ABSTRACT

A method is provided for efficiently recovering information in a distributed storage system where a list of values that should be stored on a storage device is maintained. A first convergence round is scheduled to be performed on the list of values to bring each value to an At Maximum Redundancy (AMR) state. A second convergence round is scheduled to be performed on the list by selecting a wait time interval from a predefined range of wait time intervals between starts of convergence rounds.

20 Claims, 6 Drawing Sheets

EFFICIENT FAILURE RECOVERY IN A DISTRIBUTED DATA STORAGE SYSTEM

BACKGROUND

Many enterprises, and particularly Internet-based businesses, demand vast storage to store petabytes of binary objects that are referred to as "blobs." Examples of such businesses include photo and video sharing Internet sites, e-auction sites, social networking sites, etc., for which information may be stored in geographically distributed storage domains or data centers. Customers of these businesses need access to the stored information around the clock from locations around the globe. To perform satisfactorily for their customers, these types of businesses generally require reliable storage of the objects indefinitely into the future; quick retrieval of the objects at any time from any place in response to customer requests even in the face of data center outage and network partitions; and seamless scalability of storage capacity as the business expands. Oftentimes, these businesses use storage systems referred to as key-value stores to store the numerous binary objects, where the value represents the blob to be stored in the system and the key provides an identifier that is associated with the value.

BRIEF DESCRIPTION OF THE DRAWINGS

Some embodiments of the invention are described with respect to the following figures.

DETAILED DESCRIPTION

Embodiments of the invention are directed toward a scalable storage system, which, for convenience only, will be referred to herein as a "key-blob archive" or KBA. It should be understood, however, that the invention is not limited to KBAs, but is applicable to any type of data storage system and, more particularly, distributed data storage systems. In exemplary embodiments, the KBA includes self-healing features that provide for reliable storage of information even in the face of system failures. These self-healing features may allow the KBA to continue to operate and provide services to users even under severe failure conditions, such as network partitioning, data center failures, etc. Yet further, embodiments of the KBA scale seamlessly, so that storage capacity can easily grow as business needs expand. Because of the nature of the services that may be offered to a user of a KBA system (e.g., around-the-clock, around-the-globe access to vast numbers of large, binary objects), embodiments of the KBA provide fast, reliable access to stored information despite various, simultaneous disaster situations (e.g., destruction of a data center, loss of a storage rack, etc.). In addition, to meet the needs of diverse types of businesses, exemplary embodiments of the KBA may offer the ability to tune the level of consistency and redundancy on a per-blob basis, thus providing the ability to tradeoff between performance and cost of the system in accordance with the business' priorities. Although various features of the KBA described herein are particularly tuned for the storage of large binary objects, it should be understood that the KBA may store any type or combination of types of information, including, for instance, small non-binary objects.

Figure 1:
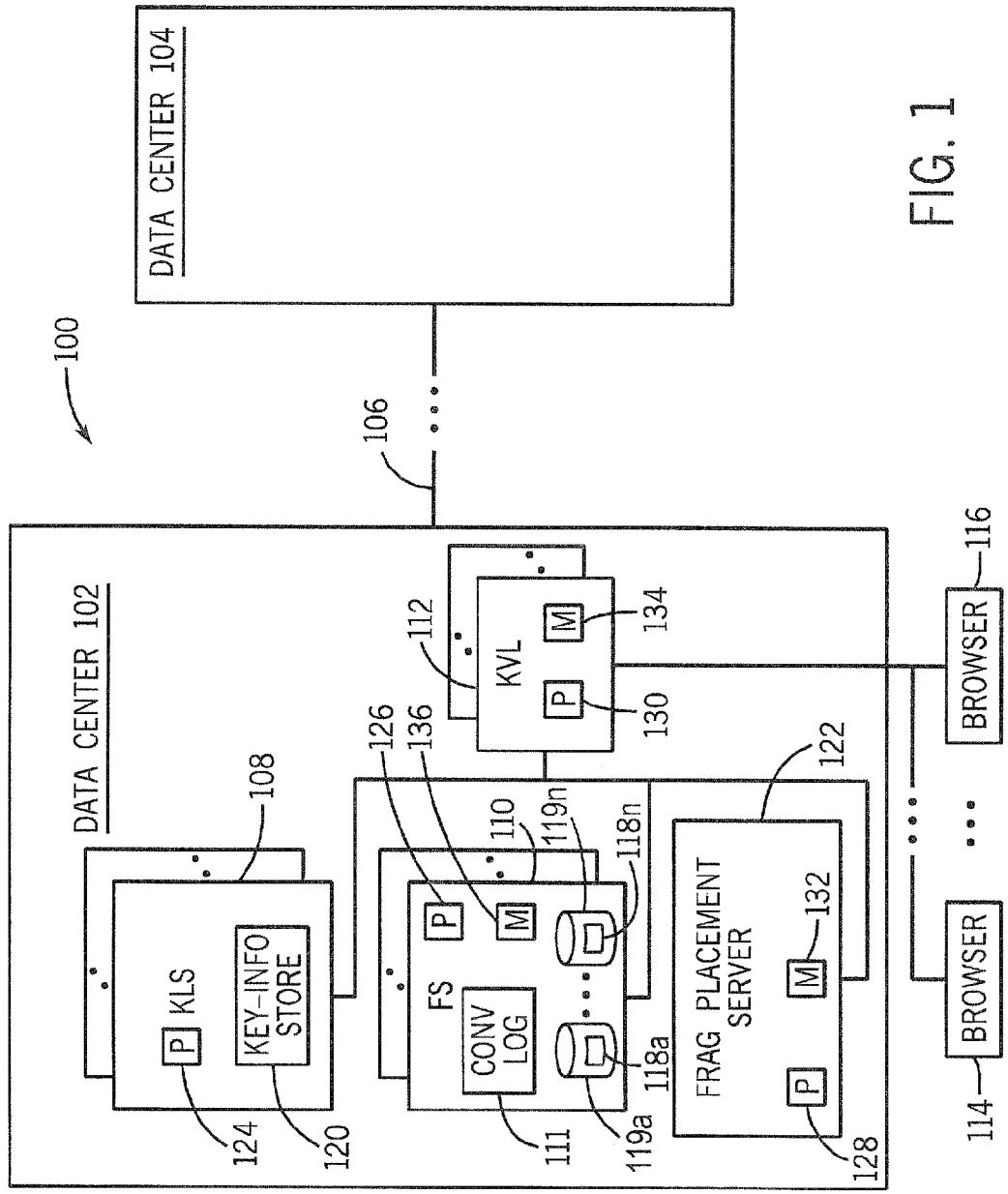
FIG. 1 is a block diagram of an exemplary distributed data storage system, in accordance with an embodiment.

Examples of a KBA and its various features are illustrated in the Figures. In the description which follows, the KBA is considered a key-value storage system, where the value is the object to be inserted into the KBA and the key is an identifier associated with the value. Turning first to FIG. 1, an exemplary KBA 100 includes a plurality of storage domains 102 and 104 coupled via a network 106. In exemplary embodiments, a storage domain may include an arrangement of storage devices and associated components, such as a data center, a portion of a data center, a storage cluster, etc., that is physically separate from other storage domains. The network 106 may include, for example, a local area network (LAN), a wide area network (WAN), a storage area network (SAN), the Internet, or any other type of communication link. In addition, the interconnect 106 may include system busses or other fast interconnects. Although two storage domains are shown, it should be understood that the KBA 100 can include any number of storage domains depending up the particular application in which the KBA 100 is implemented. Further, although the following description refers to a domain or data center being remote from another domain or data center, for instance, it should be understood that a remote domain or data center may be in close proximity to, but physically separated from, the other domain or data center.

As shown in FIG. 1, storage domain 102 includes one or more key look-up servers (KLS) 108 and one or more fragment servers (FS) 110. The KBA 100 also includes one or more key-value libraries (KVL) 112 that are in communication with one or more users, such as via browsers 114, 116. In general, the KVL 112 receives requests from the users regarding keys and optional values (or blobs) and executes the protocols for interacting with the fragment servers 110 and key-look up servers 108 to either insert or retrieve the values from the KBA 100. In an exemplary embodiment, a proxy or application (not shown) may actually receive the requests from the users and then gain access to the KBA 100 by using calls in the KVL 112. In a very general sense, which will be explained in more detail below, the fragment servers 110 collectively store the values (e.g., in encoded fragments) in fragment stores 118 a-n on one or more non-volatile storage devices 119a-n, such as a magnetic memory device, optical memory device, flash memory device, etc. Each fragment server 110 includes at least one fragment store 118. The key-lookup servers 108 maintain metadata for every key that is associated with a value that has been inserted into the KBA 100. The metadata generally provides information regarding the value, such as timestamp information, storage locations, size, type, redundancy requirements, etc. The key-lookup servers 108 include a key-info store 120 (e.g., one or more non-volatile storage devices) which durably stores the key to key-info mapping. In one embodiment, each key-lookup server 108 has one key-info store 120.

As shown in FIG. 1, storage domain 102 also includes a fragment placement server 122 which tracks free space information for all of the fragment servers 110 within storage domain 102. In general, as will be explained in further detail below, the fragment placement server 122 decides which fragment servers 110 within storage domain 102 should host fragments for a particular value being inserted into the KBA 100. Although the various components (e.g., KLSs 108, FSs 110, FPS 122, KVLs 112) are shown in FIG. 1 as separate blocks, it should be understood that any or all of the components may be co-located on the same physical server.

Although not shown, the storage domain 104 has the same architecture as storage domain 102 and, thus, also includes one or more key lookup servers 108, one or more fragment servers 110, a key-value library 112, a fragment placement server 122, etc. In addition, although only two storage domains 102, 104 are shown in FIG. 1, it should be understood that a KBA 100 may include two or more storage domains. Further, in some embodiments, to provide for redundancy, each storage domain 102, 104 may have at least one replicated pair of key-lookup servers 108 (and each server 108 may be sharded), one replicated pair of fragment placement servers 122, and multiple fragment servers 110. In addition, each of the servers may include a processing device 124, 126, 128, 130, such as a microprocessor, microcontroller, etc., and a memory 120, 132, 134, 136 for storing various applications and data, for instance. Memories 120, 132, 134, 136 may include both durable and non-durable storage elements and may further cooperate with the processing devices 123, 126, 128, 130 in executing instructions of software.

The various components of the KBA 100 illustrated in FIG. 1 communicate via a messaging protocol. For instance, in one embodiment of the KBA 100, a simple request protocol for storing and retrieving values in and from the KBA 100 is implemented. In general, this interface includes Put and Get operations to write information to and retrieve information from the KBA 100, respectively. The Put operation ensures that the various fragments corresponding to the value are stored at appropriate fragment servers 110 and that all key-lookup servers 108 are made aware of the locations at which those fragments are stored. In one embodiment, the Put operation is expressed as Put(key, blob, rspec) and inserts the value into the KBA 100 together with the key that corresponds to the value. The key may be a small string (e.g., less than 1 kilobyte), while the value may be relatively large (e.g., a hundred kilobytes to hundreds of megabytes). For reliability purposes, the redundancy specification (i.e., rspec) relates to the desired redundancy level for that particular value. Rspec may have several parameters. For instance, for systems which employ erasure correction coding algorithms (e.g., Reed-Solomon erasure codes), these parameters may include the number of fragments into which the value should be divided, how many redundant (or parity) fragments to generate (which are used to reconstruct the value in the event some fragments are lost or unavailable), and the manner in which the fragments should be distributed across the various storage domains. Rspec also may specify when the Put operation can be considered successful, which provides a knob that can affect consistency. It should be noted here that, although the key identifies a value, keys need not be unique. For instance two (key, value) pairs with the same key may be inserted into the KBA, but may be timestamped, or have a nonce added as a distinguisher. In such instances, the values may be treated as two versions of the same key.

Values associated with a key may be retrieved from the KBA 100 using a Get(key) operation. Generally, the Get operation locates the fragments for the value associated with a given key and returns the whole value as inserted by a previous Put operation. In some instances, the Get operation may return an error indicating that no version of the value was available. In one embodiment, when executing a Get operation, the KBA 100 may exert its best effort to retrieve the latest version of the value. However, if a new version was recently inserted, or if failures have made the most recent version of the value unavailable, then the Get may return an older version. In extreme cases, the Get may return a key-not-found indication.

In some implementations, the KBA 100 illustrated in FIG. 1 can function as an archive and, thus, is configured to provide highly durable storage. This may be accomplished using erasure correction coding techniques, including replication and reconstruction of data from fragments. In one embodiment, both metadata (i.e., information about the value) and data (i.e., the value itself) are stored in the KBA 100. In such an embodiment, the metadata may be replicated in each storage domain 102, 104 so that the KBA 100 will remain available during recovery and reconstruction. The values, however, are much larger than the metadata, rendering it extremely costly to provide redundancy through replication. Accordingly, in some embodiments of the KBA 100, erasure codes may be used for the values and the type of coding may be specified through the use of the rspec parameter.

For instance, in one embodiment, the redundancy specification (rspec) may be specified as a tuple (n, a, b) for each value put into the KBA 100, where n is the number of fragments to break the data into, a is the number of ECC fragments to store at a first storage domain (and hence the number of disk failures to tolerate at that storage domain), and b is the number of ECC fragments to store at a second storage domain. In accordance with this error coding scheme, as long as n fragments, of any type and at all storage domains, are available, the data can be reconstructed. For example, for an rspec (4, 2, 6), any four fragments are needed to reconstruct the value, and six fragments each are stored at each storage domain (i.e., four data fragments and two ECC fragments are stored at the first storage domain, and six ECC fragments are stored at the second storage domain). In other embodiments, the rspec may be defined in other manners as appropriate to implement the type of encoding that is used.

As briefly mentioned above, in some embodiments, the KBA 100 uses Put and Get operations to insert and retrieve values. In addition to these operations, the KBA also may implement various recovery protocols, including a convergence protocol for recovering lost fragments. In an exemplary embodiment, the terminology used in conjunction with these operations and protocols includes the following terms:

Key: an uninterpreted binary string. Keys need not be the same length. In one embodiment, the keys are at most 10 kilobytes.

Value: an uninterpreted binary string. Values need not be the same length. In one embodiment, the values range from 10 kilobytes to 1 gigabyte.

Node ID: a unique identifier for each node in the KBA. In one embodiment, each KVL host, fragment placement server, KLS, and FS is a node.

Key-value timestamp (kvt): a (timestamp, node ID) pair. The kvt is constructed based on the node's local clock.

Fragment: a fragment has two parts: a header, and the erasure-coded fragment based on encoding the value. In one embodiment, the header includes the key, kvt, rspec, fragment number (effectively an index), value size, value hash, fragment hash, and cross-fragment hash.

Redundancy specification (rspec): describes the redundancy requirements for a value. In general, in one embodiment, rspec indicates how many storage nodes store fragments and the number of data fragments and parity fragments to store at each storage node. Rspec may also specify the maximum number of erasure-coded fragments for a given Put operation that can be stored at the same FS. Rspec may also specify the minimum number of fragments necessary to consider the Put operation successful.

Fragment location: a (fragment server ID, fragment store ID, fragment number) tuple. In one embodiment, the fragment server ID is a node ID and thus is globally unique. The fragment store ID is a unique ID within a fragment server.

Placement: a list of fragment locations.

Key-info: a (kvt, rspec, placement) tuple. During the course of a Put operation, a key-info is constructed for the Put and sent to all the KLSs and all FSs that have been selected to store a fragment for the Put. A key-info may allow a Get operation to locate all necessary fragments to decode and validate a value.

It should be understood that the foregoing terminology is illustrative and only intended to facilitate the following description. The implementation of the KBA 100 is not dependent on the particular terminology used. The KBA 100 protocol may use other terminology that includes more, fewer, and/or different terms having more, fewer, and/or different parameters and/or values.

In an exemplary embodiment of the KBA 100 using the terminology defined above, a Put operation is used to insert values into the KBA. The Put generally includes selecting locations at which to store fragments in accordance with a desired rspec; updating metadata (i.e., the key-info) and storing fragments; and determining the completeness of the insertion of the value into the KBA. The return from the Put operation depends on the rspec and on how redundantly the value actually was stored. In general, if KLSs store the appropriate key-infos and sufficient fragment servers store the appropriate fragments to meet the rspec, then the Put operation is successful. The various components of the KBA shown in FIG. 1, including the KLSs, the FSs, and the KVL in each of the storage domains interact with one another via messaging to implement these operations.

Figure 2:
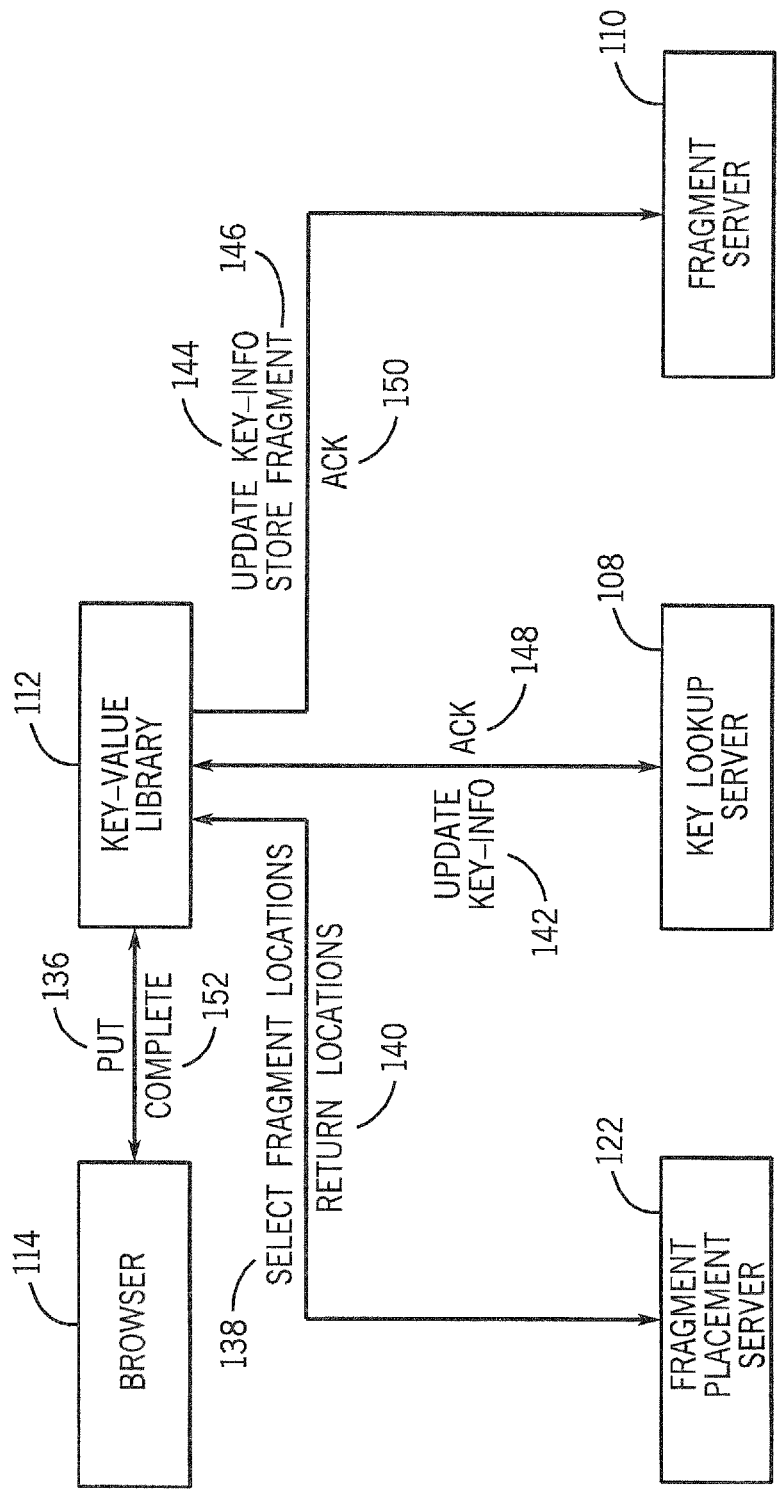
FIG. 2 is an illustration of an exemplary messaging protocol to insert values into the data storage system, in accordance with an embodiment.

For instance, in one embodiment, and with reference to the exemplary Put operation shown in FIG. 2, a request 136 from a user to insert a (key, value) pair into the KBA 100 invokes Put(key, value, rspec) via, for instance, browser 114. The user may supply the key, the value, and the rspec. The KVL 112 receives the request 136 (e.g., via a proxy) and generates the kvt (i.e., a (local time, node ID) pair). Then, for that (key, kvt) pair, the KVL 112 sends a request 138 to the fragment placement servers 122 at each of the storage domains 102, 104 asking for potential storage locations (i.e., fragment stores 118 on the FSs 110) for the value's fragments. The fragment placement servers 122 may reply 140 with storage location recommendations based on various parameters, such as the current load on the FSs 110 at the particular storage domain 102, 104, the current amount of free storage space on the various FSs 110 at the storage domain 102, 104, etc. The fragment placement server 122 for each storage domain sends location information (i.e., a placement) for that storage domain back to the KVL.

In other embodiments, the fragment placement servers 122 may be omitted and the KVL 112 may request locations directly from the KLSs 108. In such embodiments, each of the KLSs 108 at the storage domains 102, 104 sends its recommendations for its own storage domain back to the requesting KVL 112. For each storage domain 102, 104, the KVL 112 uses only the first response that it receives to choose the locations for the responding storage domain. Once a first response from a storage domain is received, all other responses from that storage domain are ignored. The KVL 112 then uses the rspec to select the locations at each storage domain 102, 104 based on the first responses received from each storage domain 102, 104. The KVL 112 may also cache locations provided on previous Put operations and reuse those locations.

Once the KVL 112 has a set of locations for a specific storage domain, it sends updates 142, 144 to all of the KLSs 108 in the KBA 100 (i.e., in both storage domains 102, 104) and the selected FSs 110 asking them to store the (key, key-info) pair, which includes the placement. If the updates are not received by either the KLSs 108 or the FSs 110 (e.g., due to a dropped message, network outage, etc.), then the convergence protocol, which will be described below, repairs the discrepancy. In one embodiment, the KVL 112 updates all the KLSs 108 and the selected FSs 110 in the KVL's storage domain as soon as it receives location information from any data center. Thus, the first update may include only the locations (L1) for one of the storage domains. When the KVL 112 receives the placement (L2) from the second storage domain, it again updates all the KLSs 108 in the KBA 100 and the selected FSs 110 in both storage domains. This time, however, the update includes both placements L1 and L2. Thus, the KLSs 108 and the selected FSs 110 may have multiple entries for a particular key.

In this exemplary embodiment, while the KVL 112 waits for the placement information, it computes the fragments that it will send to the FSs 110 based on the rspec. As soon as the KVL 112 receives a placement for a fragment, it sends the fragments to the selected FSs 110 for those fragments.

The KLSs 108 and FSs 110 acknowledge 148, 150 the receipt of the (key, key-info) updates and the new fragments to the KVL 112. When the KVL 112 knows that a sufficient number of KLSs 108 have a current set of locations for a (key, key-info) pair and enough fragments have been stored stably (e.g., as determined by the rspec in the key-info), the KVL 112 provides an indication of success 152 (i.e., completeness) back to the user. The number of fragments stored before indicating success affects the reliability of the KBA 100.

Figure 3:
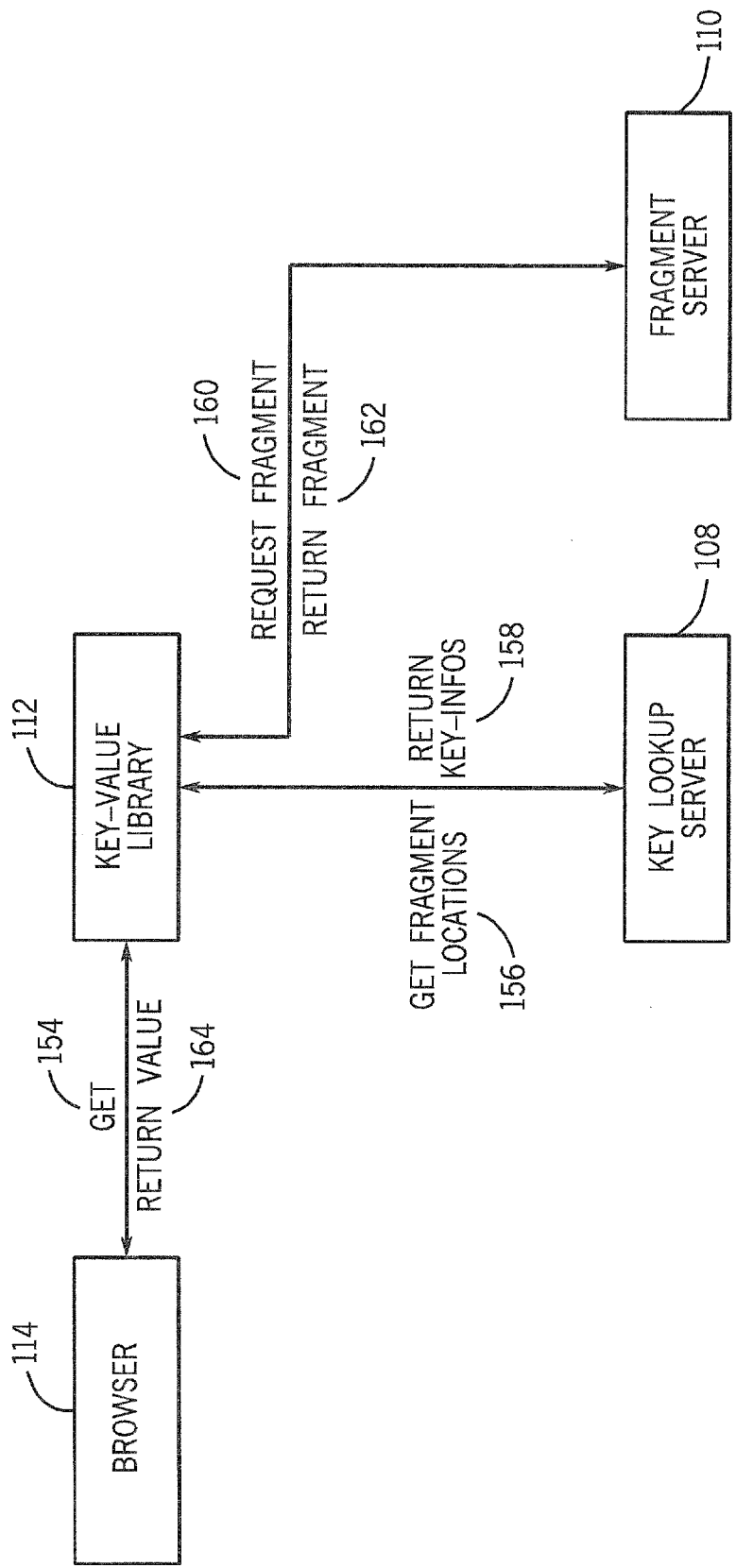
FIG. 3 is an illustration of an exemplary messaging protocol to retrieve values from the data storage system, in accordance with an embodiment invention.

Turning next to the Get operation, it generally operates to discover fragment locations for the requested value; retrieve fragments; try harder if either the locations cannot be discovered or the fragments cannot be retrieved; and construct the requested value from retrieved fragments. For instance, in one embodiment and with reference to FIG. 3, to discover the locations of the fragments, the KVL 112 receives a Get(key) request 154 from browser 114 and then attempts to locate the fragments for the value associated with the key by sending messages 156 to the KLSs 108. In one embodiment, the KVL 112 selects one KLS 108 and requests the locations for a given key. When the KLS 108 receives the request, it replies 158 with all of the key-info it has for that key (i.e., the KLS 108 may have multiple key-infos for a given key).

To retrieve the fragments, the KVL 112 picks the most recent locations (as indicated by the kvt in the key-infos) that can reconstruct the value and sends a request 160 for the fragments to the corresponding FSs 110. The FSs 110 return 162 the fragments if they have them. A value is considered reconstructible if the number of discovered locations is at least the number of data fragments specified in the rspec in the key-info. In one embodiment, the KVL 112 retrieves just enough fragments from the FSs 110 to recover the most recent value. If enough FSs 110 are not available such that a sufficient number of fragments cannot be retrieved, then the KVL 112 may request locations from another KLS 108 (if the KVL 112 does not already know all of the locations).

If the KVL 112 still is unable to retrieve sufficient fragments for the most recent version of the value, then the KVL 112 attempts to retrieve the value associated with an older timestamp using the same steps it used in its attempt to retrieve the most recent value. If no older timestamp exists, then the KVL 112 returns an indication of a failure. However, if a sufficient set of fragments is retrieved, then the KVL 112 reconstructs the value using error correction blocks as needed. The KVL 112 then returns 164 the value to the browser 114.

As discussed previously, the KBA 100 is implemented in a failure-prone environment. Data centers may become unavailable, servers within data centers may fail, the network may undergo temporary partitions, etc. Should any of these failure events occur or exist while a Put operation is being implemented, values may not be stored completely. Likewise, failure events that occur after values have been successfully inserted into the KBA may result in loss of some of the fragments. Accordingly, embodiments of the invention provide for a convergence protocol that repairs metadata and fragments after failures.

Referring to FIGS. 1 and 2, the KBA 100 stores metadata (e.g., the key-info) for each value in all of the KLSs 108 and data (i.e., fragments of redundantly encoded values) in selected FSs 110. Under fault-free conditions, the Put operation ensures that every KLS 108 stores the metadata for the Put, and each selected FS 110 for the (key, key-info) pair stores the appropriate fragment. If these conditions are met, then the Put operation completes at an "At Max Redundancy" (or AMR) state. However, various kinds of failures (e.g., message drops, machine crashes, disk failures, network partitions, failure of KVL 112 during a Put operation) may cause some metadata and data to be missing from their intended locations and, thus, a Put operation may not complete at AMR. As one example, assume that during a Put operation, the KVL 112 has updated all of the KLSs 108 and selected FSs 110 with metadata, but all of the fragments have not been stored. If a network partition occurs, then the missing fragments will not reach their intended locations. If the failure conditions persist, AMR can never be reached for the affected value. However, if the failure conditions do not persist, then it may be possible that a non-AMR state may be converged to an AMR state. As used herein, the process of attempting to reach AMR for a given value is referred to as convergence.

In some embodiments, to ensure that there is no central failure point, every FS 110 in the KBA 100 performs the convergence protocol independently. A convergence step runs the convergence protocol for a specific (key, key-info) pair stored at the FS 110. In one embodiment, a round of convergence involves running a convergence step for every (key, key-info) pair having a fragment stored at the FS 110 to ensure that it is at the AMR state and/or to converge it to the AMR state. An FS 110 stores the (key, key-info) pairs logically in a list or queue, such as in a convergence log 111. Although the convergence log 111 is shown separately in FIG. 1, it should be understood that the log 111 may be stored in any suitable storage device in the FS 110, such as the memory 136. Every FS 110 runs a round of convergence periodically (e.g., every minute) over all the entries in the convergence log 111. In general, convergence involves checking whether a (key, key-info) pair stored in the log 111 is at AMR and, if not, then, recovering the value associated with the key and updating the key-info as needed. An exemplary convergence step to converge a specific (key, key-info) pair is represented in the flow diagram of FIG. 4.

Figure 4:
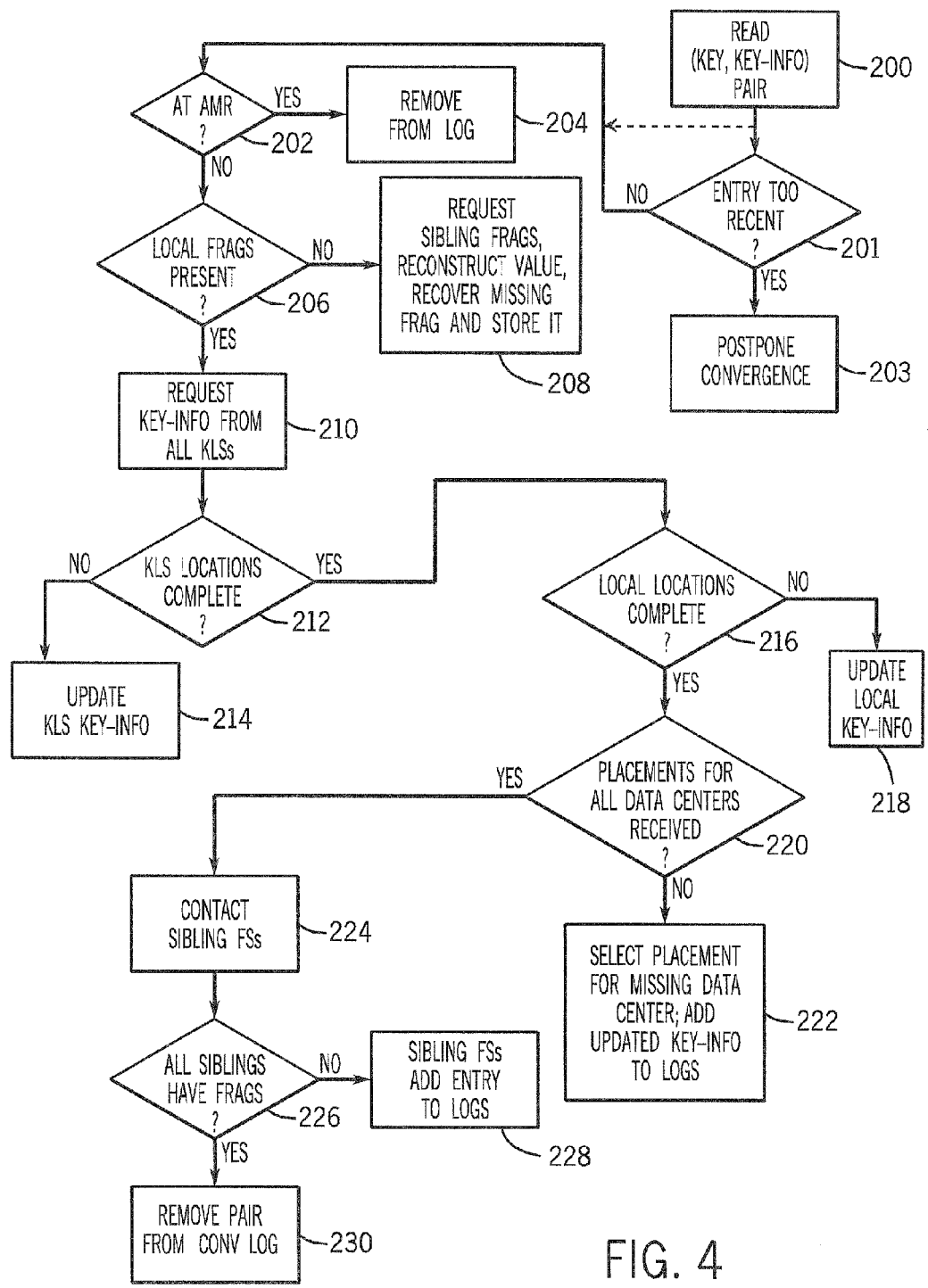
FIG. 4 is a flow diagram of an exemplary convergence technique that may be implemented in the data storage system, in accordance with an embodiment.

In FIG. 4, each of the FSs 110 runs a convergence step that reads each entry in its convergence log 111 (block 200) and determines whether the stripe for that entry (i.e., all of the encoded data stored for a (key, key-info) pair) is at AMR (diamond 202). For instance, in one embodiment, the entry itself may include an indication that the (key, key-info) pair is at AMR (e.g., an AMR bit(s) may be set). If the entry is at AMR, then the entry is removed from the log 111 (block 204) and no further action is taken. In some embodiments, when the FS 110 removes the entry from its convergence log 111, it may update the key-info in a redundant key-info store (not shown) to indicate that the corresponding value is at AMR. In such an embodiment, the redundant key-info store may be maintained on a disk 119 distinct from the fragment store 118 for which it maintains metadata.

Returning to FIG. 4, if the entry is not at AMR, then the converging FS 110 attempts to bring the (key, key-info) pair to AMR, including recovering any missing fragments if necessary. More specifically, when implementing a convergence step, a converging FS 100 starts by verifying that the local fragments for that (key, key-info) pair in the log 111 exist (i.e., are locally stored at the specified locations in that FS) (diamond 206). If a local fragment is missing, then the converging FS 110 attempts to recover it by requesting fragments from sibling FSs (i.e., FSs that should have the other fragments in the stripe for that particular value) (block 208). The converging FS 110 determines the sibling FSs from the key-info information for the key that corresponds to the requested value. If the sibling FSs return sufficient fragments, then the converging FS 110 reconstructs the original value and encodes it to obtain the fragment that it should have had and stores it in its fragment store 118. The entry corresponding to the fragment remains on the converging FS's convergence log 111 so that it will be checked for AMR during the next round of convergence. In some embodiments, the sibling FSs 110 may determine that they have the requested sibling fragments either by checking the appropriate redundant key-info store 310 or by checking the appropriate fragment store 118 directly.

If all local fragments for the value are present, then the converging FS 100 contacts all KLSs 108 in the KBA 100 for their key-info corresponding to the key (block 210). The converging FS 110 then compares its location information with the location information in the key-infos obtained from the KLSs 108. If the FS 110 determines that any of the KLSs 108 have incomplete locations (diamond 212), then the converging FS 110 may also update those KLSs 108 with the FS's locations (block 214) and then may terminate or continue on to diamond 216. If a KLS 108 has more locations than the FS 110 has (diamond 216), then the FS 110 updates its key-info in its convergence log 111 to include the new locations (block 218) and then may terminate or continue on to diamond 220. In this way, a converging FS 110 ensures that all KLSs 108 and the relevant FSs 110 have complete metadata so that in the next convergence round, the (key, key-info) pair may reach AMR, if possible.

In some embodiments, the converging FS 110 may also cache an indication of which KLSs 108 have the complete key-info for that (key, key-info) pair. Thus, in the next round of convergence, the converging FS 110 does not have to send requests to those KLSs 108 for their key-info, which will help speed up convergence.

Returning to the current convergence round, the converging FS 110 also ensures that a complete stripe for the (key, key-info) pair exists. Here, if the converging FS 110 has incomplete fragment locations for the stripe (diamond 220) (e.g., the FS 110 notes that neither it nor any of the KLSs 108 has a placement for a remote data center), then the converging FS 110 initiates a procedure to select locations for the fragments at the remote data center and complete the stripe (block 222). Once the placement is complete, the updated key-info with the complete placement is sent to all the KLSs 108 and the selected FSs 110 so that on the next round of convergence, the (key, key-info) pair may reach AMR, if possible. It should be noted that the current convergence round may not terminate at block 222, but may continue on to block 224

At block 224, the converging FS 110 further contacts all sibling FSs 110 (as determined from the key-info) to verify they have the corresponding fragments in their fragment stores 118. Again, the sibling FS 110 may make this determination either by looking directly in its fragment store(s) 118 or by referring to its redundant key-info store 310. If a sibling FS 110 does not have the (key, key-info) pair (diamond 226), it adds the entry to its convergence log 111 so that the missing fragment(s) may be recovered (e.g., during that FS's next round of convergence or immediately) (block 228). If a message from a sibling FS 110 is received that indicates that the sibling FS 110 has its fragment(s), then the converging FS 110 may store that indication to keep track of which sibling fragments are stored correctly. For instance, in some embodiments, the converging FS 110 may include a bit for every KLS 108 and each sibling FS 110 in the metadata. If this bit is set to "1," then the converging FS 110 knows that it has already received a successful response from the KLS 108 or FS 110 in question. Again, keeping track of which fragments are properly stored may save time on subsequent convergence rounds since the converging FS 110 can omit sending messages to the sibling FSs 110 requesting their fragments.

If all of the KLSs 108 have replied with complete key-info (indicating that the stripe is complete) and all of the sibling fragments are stored by the appropriate sibling FSs 110, then the converging FS 110 knows that the (key, key-info) pair is at AMR and may drop the entry from its convergence log 111 (block 230). In some embodiments, the FS 110 also may update its redundant key-info store 310 with key-info that indicates that the value is at AMR and also may send an AMR indication to any sibling FSs 110. Convergence thus eventually will bring all (key, key-info) pairs in a convergence log 111 to AMR, except for the case where no location information is ever received from one data center, and the case where insufficient fragments exist to reconstruct a value. More particularly, all KLSs 108 will eventually learn all location information because a converging FS 110 contacts all the KLSs 108. All sibling FSs 110 will learn they should have a fragment because of the contact from each converging FS 110. All FSs 110 will recover their fragments, if possible, as a result of checking whether the local fragments are present.

In some instances, the convergence protocol just described can be inefficient since it requires communication of a large number of messages and transfer of information between the various components in the KBA 100. In particular, converging a (key, key-info) pair requires communication among all fragment servers 110 holding the stripe's fragments and all KLSs 108. In many instances, many FSs may be attempting convergence of the same (key, key-info) pair at the same time, thus consuming large amounts of communication bandwidth both within a particular storage domain and between storage domains. Some of these communications may be unnecessary in the sense that the work performed by the FSs may be duplicative. In additional, computational costs associated with convergence can be high due to the error correction coding computations to recover missing information.

Accordingly, as will be described in detail below, embodiments of various techniques are implemented to enhance the efficiency of the recovery of missing information in the distributed KBA 100 by reducing the number of messages sent between domains (e.g., domains 102, 104), the number of bytes exchanged between domains (e.g., over network 106), and/or the amount of computation performed at the various domains. These techniques generally involve controlling the timing at which convergence rounds are run by the various servers, allowing a particular sibling FS 110 to perform recovery for all sibling FSs 110, and/or performing error correction coding in a remote storage domain to reduce the amount of data that is transmitted across the wide area network (e.g., network 106).

With respect to controlling the timing of convergence, as discussed previously, each FS 110 runs convergence independently in periodic rounds (e.g., at intervals of one minute). Due to the short time interval, it is possible that convergence is attempted on an entry for which the Put operation may still be in progress. To avoid such premature convergence and as shown in the flow diagram of FIG. 4, the FS 110 may be configured to postpone convergence of entries that are too young (e.g., less than five minutes old) (diamond 201 and block 203). The FS 110 may determine that the entry is too young by checking the kvt parameter in the key-info. This technique helps optimize convergence because it avoids needless work.

In addition, during each convergence round, a convergence step is performed for each (key, key-info) pair the FS 110 has not yet determined is at the AMR state. In a convergence step (as explained above with reference to FIG. 4), the FS 110 verifies that (1) it has complete metadata (i.e., sufficient locations to meet the durability requirements specified in the Rspec policy); (2) it stores the appropriate sibling fragments locally; (3) that all KLSs 108 store complete metadata for the value; and (4) that all sibling FSs 110 store verified metadata and sibling fragments. If verification is successful, then the (key, key-info) pair is AMR and the FS 110 excludes it from subsequent convergence rounds. If the FS 110 has incomplete metadata, then the FS 110 asks a KLS 108 to suggest locations for the encoded fragments. If the FS 110 is missing fragments, then the FS 110 retrieves sibling fragments so that it can generate its missing fragment via erasure coding. By repeatedly performing convergence steps on a (key, key-info) pair with sufficient durably stored fragments, the (key, key-info) pair eventually will be AMR.

In the embodiment discussed above, each FS 110 starts a convergence round at periodic intervals of one minute. However, since sibling FSs 110 generally are sent fragments for a particular value at the same time, the sibling FSs 110 all are likely to run the corresponding convergence steps for sibling fragments simultaneously. Accordingly, in some embodiments, to improve the chance of only one sibling FS 110 performing a sibling convergence step on a particular entry in the log, each FS 110 schedules its convergence rounds to start within a predefined range of minimum and maximum wait times (e.g., between 30 and 90 seconds, for instance). For instance, each FS 110 may randomly select wait times from the predefined range. In other embodiments, each FS 110 may select wait times from the predefined range in a deterministic manner so that the starts of the various convergence rounds will be staggered. Regardless whether the staggering results from a random or deterministic selection, the staggering of the start of convergence rounds encourages sibling convergence steps to be unsynchronized. When a sibling FS 110 does determine that the entry is at the AMR state, the FS 110 can then send an AMR indication to its sibling FSs 110 so that they do not initiate (or continue) convergence steps for the (key, key-info) pair. As a result, the staggered scheduling of the start of a convergence round can avoid needless work since all sibling FSs 110 may not be performing convergence steps for sibling fragments simultaneously. In addition, an FS 110 that is earlier running its convergence step on a particular entry may determine that the entry is AMR and thus stop its sibling FSs 110 from starting (or continuing) their corresponding convergence steps.

Needless convergence work also may be avoided by stopping FSs 110 from attempting convergence on an entry that either can never reach AMR or cannot reach AMR until some failure is repaired. A value can reach AMR only if it has a sufficient number of durably stored fragments. That is, as long as a value has fewer than n (where n is the number of fragments for the value) sibling fragments, it can not achieve AMR. This situation of an insufficient number of sibling fragments can potentially result in the sibling FSs 110 invoking convergence steps forever but in vain or for at least as long as the failure remains unrepaired. Accordingly, in some embodiments, a backoff technique (e.g., an exponential, quadratic, or linear backoff) is implemented to decrease the frequency with which convergence steps are attempted by an FS 110. In accordance with this technique, the older the version of the non-AMR entry, the longer before a convergence step is tried again. Ultimately, beyond this limit, convergence attempts may be abandoned altogether after passage of a sufficient period of time (e.g., two months).

As an example of backoff, if a convergence step does not achieve AMR for the (key, key-info) pair, the FS 110 sets a maximum step-wait time before it will attempt the convergence step again. For instance, the maximum step-wait time initially may be set at one minute. After each subsequent convergence step that does not achieve AMR, the maximum step-wait time is increased by a predefined factor. For example, the maximum step-wait time may be increased by a factor of 2 (or a factor of 4, a factor of 10, etc.) after each unsuccessful convergence attempt. The actual step-wait time before again starting the convergence step for that entry then may be drawn uniformly between 0 and the maximum wait time. Thus, if the initial maximum step-wait time is one minute, then after the next unsuccessful convergence attempt, the FS 110 sets the maximum step-wait time to two minutes, but may wait only 90 seconds before starting the convergence step again.

An upper maximum step-wait time limit may also be set. Generally, this step-wait time limit may be related to the expected lifetime of the failure. For instance, if a failed storage device typically can be discovered and replaced within five days, then the maximum step-wait time limit may be set at one week. The maximum step-wait time may then remain at this limit for a time period that has been specified for abandoning convergence attempts altogether (e.g., two months).

In some embodiments, if a subsequent convergence step results in partial progress towards achieving AMR (e.g., some, but not all, of the sibling FSs 110 now have their fragments), then the maximum step-wait time may be decreased (e.g., exponentially, quadratically, or linearly).

Controlling the timing of convergence rounds and convergence steps in the manners described above can reduce the number of messages and the number of bytes transmitted between storage domains 102, 104. In some embodiments, communication bandwidth may be further conserved by effectively placing limits on the number of bytes that are transmitted to a remote storage domain when recovering missing fragments.

To illustrate, one of the most common failures in a distributed storage system is a network partition. In the event of a partition, one entire storage domain 102 or 104 will need to perform recovery after the partition heals. In the simplest case, this results in a situation in which all of the sibling FSs 110 at the remote storage domain (e.g., domain 104) will attempt to recover their respective missing fragments. To do so, each sibling FS 110 will retrieve n fragments across the network 106, decode the retrieved fragments, and then re-encode to recover its missing fragment(s). This duplicative (and costly) retrieval and decoding of fragments may be avoided by designating one sibling FS in the remote storage domain 104 to recover the missing fragments for a particular value and then share the recovered fragments with its sibling FSs in storage domain 104. Not only does this solution reduce the amount of computation that is performed at the storage domain 104, but it also significantly reduces the traffic across the network 106 between domains 102 and 104.

Any FS 110 can be designated to help its sibling FSs 110 recover their missing fragments. In one embodiment, designation of a recovering FS 110 can be accomplished by including a flag or other indication in messages sent to sibling FSs 110 during a convergence step. For instance, if an FS 110 starts a convergence step on a non-AMR entry and discovers that it needs to recover a fragment, then the message sent to the sibling FSs 110 to retrieve sibling fragments can include a flag that is set to inform the sibling FSs 110 that the converging FS 110 intends to recover fragments for the sibling FSs 110. Thus, when a sibling FS 110 replies to the message from the converging FS 110, the reply may indicate whether the sibling FS 110 has its fragment(s) and, if not, whether the sibling FS 110 wants the converging FS 110 to perform recovery on behalf of the sibling FS 110. The converging FS 110 may then wait some time to accumulate replies (or timeouts) from all sibling FSs 110 and then recover the missing sibling fragments that it was asked to recover. The converging FS 110 can then send the recovered sibling fragments to the appropriate sibling FSs 110 in that storage domain.

As discussed above, multiple sibling FSs 110 may be simultaneously performing a convergence step on a particular (key, key-info) pair. Accordingly, to prevent the situation in which each of these converging FSs 110 also attempts to simultaneously recover missing fragments for their sibling FSs 110, each FS 110 tracks whether it is currently attempting sibling fragment recovery. If it is, then when that FS 110 receives a converge message from a sibling FS 110 that indicates that the sibling FS 110 also is attempting to recover sibling fragments, then the FS 110 may back off. Various policies may be defined for determining whether an FS 110 should back off from its attempt to recover sibling fragments. In one embodiment, an ordering is predetermined for the FSs 110 and/or the storage domains 102,104, and an FS 110 backs off only if it has a unique server ID (or node ID) that is lower than the server ID (or node ID) of the sibling FS 110. If the FS 110 does not back off, then when the FS 110 replies to the converge message, it includes an indication that it does not want fragment recovery to be performed on its behalf.

On the other hand, in some embodiments, if the FS 110 backs off, then the FS 110 may also set a delay ($t_{BACKOFF\_WAIT}$) to delay start of its own convergence step for the particular (key, key-info) pair. In embodiments in which exponential backoff is also implemented, then the delay interacts with the backoff with the maximum delay dominating.

The sibling fragment recovery techniques discussed above can reduce the number of messages and the number of bytes that are transmitted over the network between remote storage domains. In addition, the amount of computation performed to recover fragments also may be reduced. Further efficiencies in the amount of information transmitted and computation performed may be realized by limiting the number of fragments that are transmitted over the network 106 for recovery, if possible. For instance, in many instances, more than n (i.e., the number of fragments for a value) erasure-coded fragments are stored at a remote storage domain (e.g., domain 104). If this is the case, then it is most byte-efficient over the wide area network link 106 to send a replica (or only n data fragments) to a single sibling FS 110 that is attempting recovery at the remote storage domain 104. This sibling FS 110 can then generate the additional erasure-coded fragments (as defined by the Rspec policy) for the other sibling FSs 110 at the remote storage domain 104. Thus, any time more than n sibling fragments are required at a storage domain that is remote from the originating FS 110, the originating FS 110 sends only n fragments to a particular sibling FS 110 at the remote domain and delegates the generation of the additional erasure encoded fragments to the remote sibling FS 110.

Figure 5:
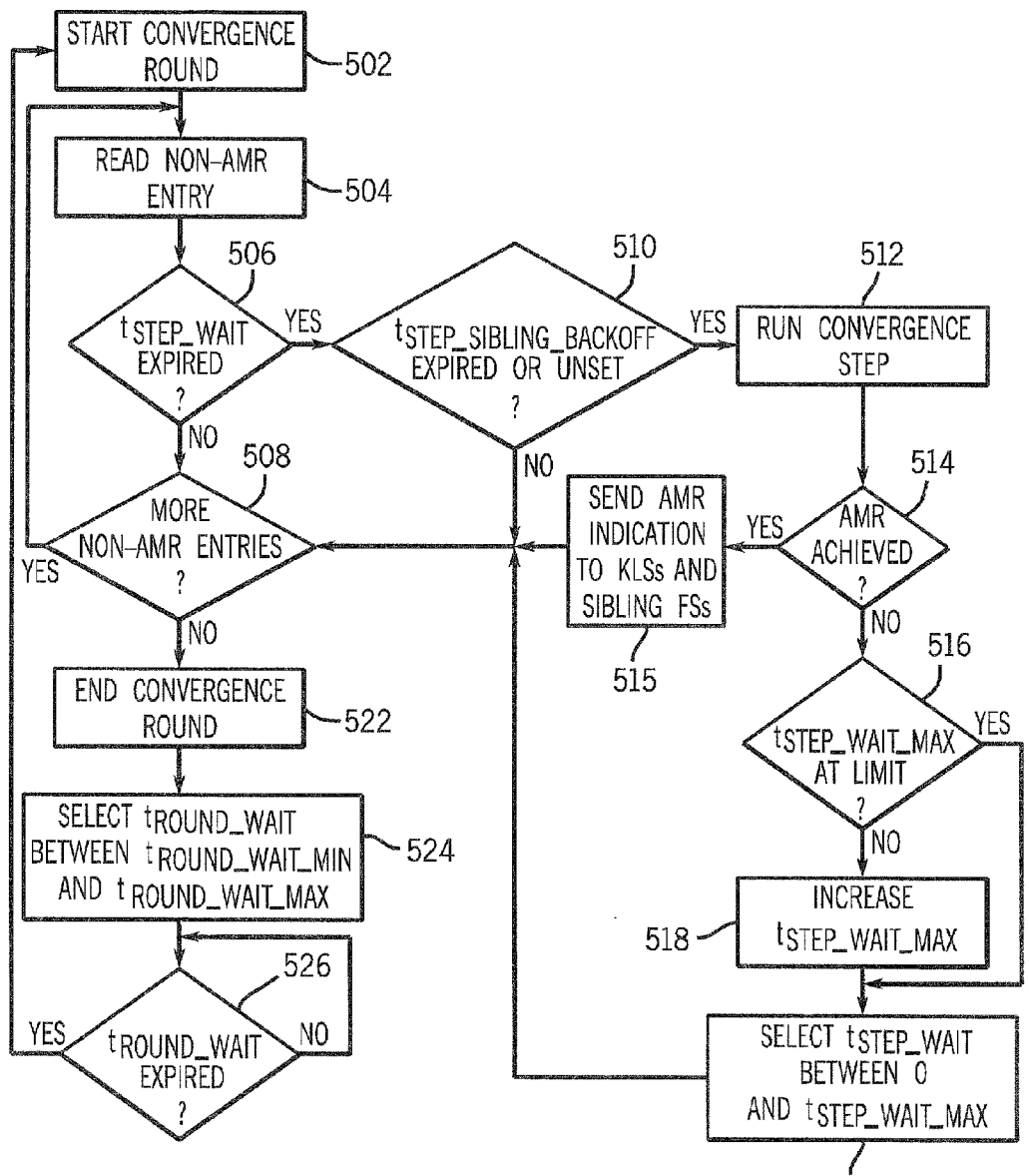
FIG. 5 is a flow diagram of an exemplary optimization technique that may be implemented with the convergence technique, in accordance with an embodiment.
Figure 6:
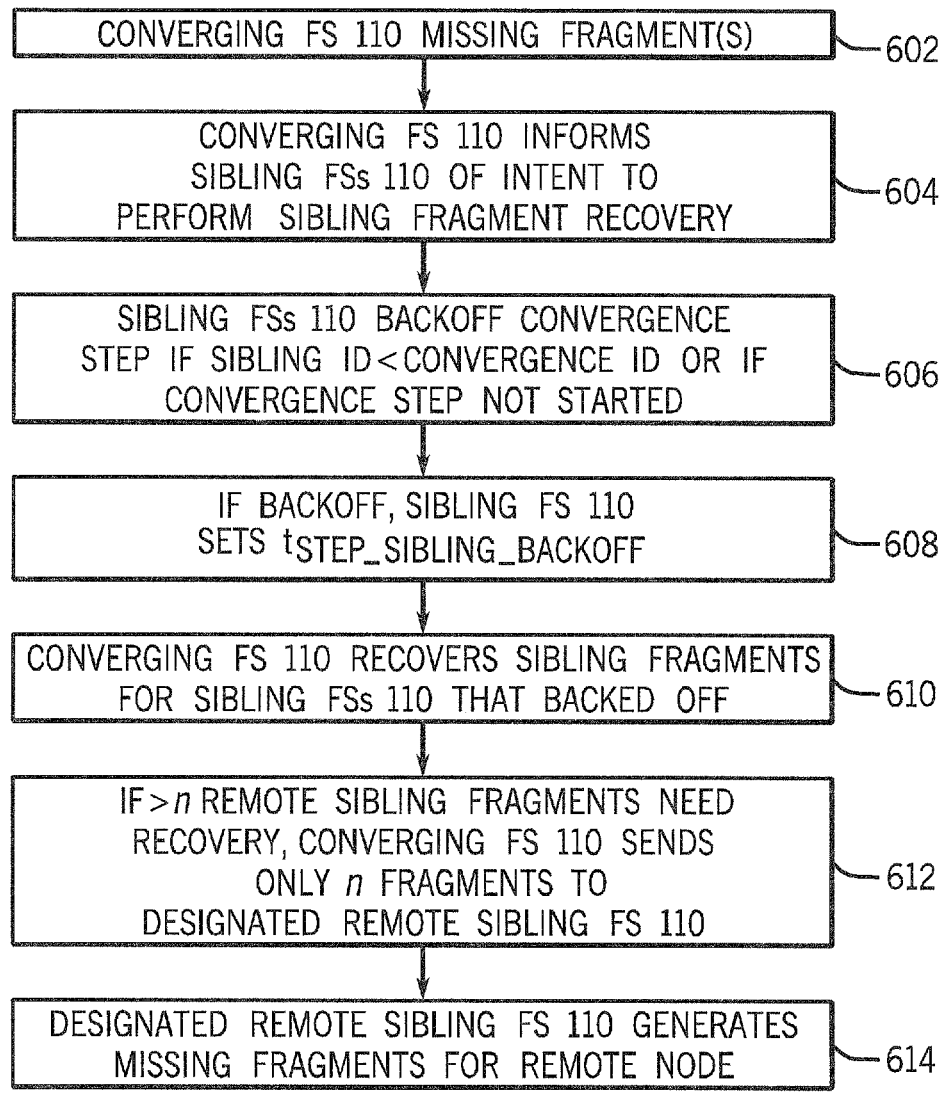
FIG. 6 is a flow diagram of another exemplary optimization technique that may be implemented with the convergence technique, in accordance with an embodiment.

The efficiencies that can be realized by limiting the number of sibling fragments that are transmitted over the wide area network 106 to a remote storage domain can also be extended to the Put operation when the value initially is inserted into the KBA 100. For instance, rather than transmitting all of the erasure encoded fragments that need to be stored at a remote storage domain, only n fragments are sent across the network 106 to a designated FS 110 in the remote domain. The remote designated FS 110 then performs the computation necessary to generate the erasure encoded fragments and transmits the fragments to the appropriate sibling FSs 110 over the local network within the remote domain FIGS. 5 and 6 illustrate exemplary flow charts of the optimization techniques discussed above that may be used to increase the efficiency of recovery of missing information in a distributed system, such as by implementing the convergence protocol shown in FIG. 4 in the KBA of FIG. 1. It should be understood that the steps shown in the flow charts of FIGS. 5 and 6 are exemplary only and that the techniques may include different, additional or fewer steps, some or all of which may be performed in an order other than that illustrated in the figures.

Referring first to FIG. 5, when a convergence round is started (block 502), a non-AMR entry is read from the log 111 (block 504). If a step-wait time ($t_{STEP\_WAIT}$) for that entry has been set and has not yet expired (diamond 506), then it is determined whether there are additional non-AMR entries listed on the log 111 (diamond 508). If so, then the technique returns to block 504 and reads the entry. However, if a step-wait time ($t_{STEP\_WAIT}$) has been set and has expired (diamond 506), then it is determined whether a step sibling backoff delay time ($t_{STEP\_SIBLING\_BACKOFF}$) has expired or is not set (diamond 510). If $t_{STEP\_SIBLING\_BACKOFF}$ has not expired, then the technique again moves to the next entry on the log, if any (diamond 508). If $t_{STEP\_SIBLING\_BACKOFF}$ has expired, or has not been set, then the convergence step for that entry is executed (block 512). If the convergence step achieves AMR for that entry (diamond 514), then an AMR indication may be sent to all KLSs 108 and sibling FSs 110 (block 515) and a new convergence step begins by reading the next entry on the log 111, if any (diamond 508). If the entry did not achieve AMR and if the maximum step-wait time ($t_{STEP\_WAIT\_MAX}$) for that entry is not already at the upper limit (diamond 516), then the maximum step-wait time for the entry is exponentially increased (block 518) and a new step-wait time ($t_{STEP\_WAIT}$) is selected between 0 and $t_{STEP\_WAIT\_MAX}$ (block 520). The next non-AMR entry, if any, is then read (diamond 508).

When all entries on the convergence log 111 have been read (diamond 508), the convergence round ends (block 522). The FS 110 then selects a new delay time ($t_{ROUND\_WAIT}$) between $t_{ROUND\_WAIT\_MIN}$ (e.g., 30 seconds) and $t_{ROUND\_WAIT\_MAX}$ (e.g., 90 seconds) (block 524). Once $t_{ROUND\_WAIT}$ expires, then the FS 110 may start a new round of convergence (block 502).

The flow chart in FIG. 6 illustrates an exemplary sibling fragment recovery technique. When a converging FS 110 is missing local fragments (block 602), the converging FS 110 sends a converge message to its sibling FSs 110 informing the siblings of the converging FS 110's intent to recover fragments and its willingness to also recover fragments on behalf of the siblings (block 604). If the sibling FS 110 does not require fragments to be recovered, it simply acknowledges the converge message from the converging FS 110. If the sibling FS 110 requires fragments to be recovered, it must either backoff to let the converging FS 110 recover its fragments, or recover its own fragments. The sibling FS 110 may then back off its corresponding convergence step if the sibling FS 110 has not started its corresponding convergence step, or if it has started its corresponding convergence step and has a server ID (or node ID) that is lower than the ID of the converging FS 110 (block 606). If the sibling FS 110 intends to recover its own fragments and does not backoff, it informs the converging FS 110 that the converging FS 110 should not perform recovery on its behalf. If the sibling FS 110 backs off, then the sibling FS 110 sets a step sibling backoff delay time ($t_{STEP\_SIBLING\_BACKOFF}$) for starting its corresponding convergence step (block 608). For instance, the sibling FS 110 may set the backoff delay time at a time (e.g., 12:55 p.m.) that is five minutes past the current time (e.g., 12:50 p.m.). The converging FS 110 recovers and sends the sibling fragments to the sibling FSs 110 that did not back off (block 610).

At this point, if the converging FS 110 determines that more than n recovered sibling fragments must be sent across the network 106 to a remote storage domain, then the converging FS 110 sends only n fragments to one of the remote sibling FSs 110 and designates that remote FS 110 to generate the missing sibling fragments for the remote domain (block 612). The remote FS 110 then generates the missing fragments for the remote storage domain from the n received fragments and distributes them to the appropriate FSs 110 at the remote domain for storage (block 614).

In other embodiments, rather than restricting the number of fragments that can be sent over the network, sibling recovery may be performed by limiting an FS 110 to recovering only local sibling fragments. While this latter technique reduces the number of fragments that are transmitted over the network, it may not reduce the number of messages that may be sent as multiple sibling FSs 110 attempt to converge the same value.

It should be understood that the convergence protocol described above may be implemented without any of the optimization techniques described herein. It should further be understood that if a recovery optimization is used, the various optimization techniques are not necessarily dependent on the others. Thus, various combinations of optimization techniques may be implemented. Yet further, the selection of a particular optimization technique or combination of techniques may depend on the particular application in which the KBA 100 is implemented. In addition, tracking of (key, key-info) pairs or values that are at AMR or that need to be converged may be performed in manners other than the specific log structure discussed above. Still further, the recovery optimization techniques described above may be used in conjunction with recovery schemes that include different, additional, or fewer steps than the convergence protocol described above. Alternatively, the optimization techniques may be used in conjunction with recovery schemes in replica-based storage systems instead of the erasure-coded storage system described above.

Instructions of software described above (including the messaging protocol, the convergence protocol and/or any of the techniques shown in the figures) are loaded for execution on a processor (such as one or more CPUs 124, 126, 128, 130 in FIG. 1). The processor may include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data, data structures, and instructions (of the software) are stored in respective storage devices, which are implemented as one or more computer-readable or computer-usable storage media (such as one or more memories 120, 132, 134, 136 in FIG. 1). The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the data, data structures and instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of recovering information in a distributed storage system, comprising:
   maintaining a list of entries corresponding to values for storing on a first storage device in the distributed storage system;
   defining a range of wait time intervals between convergence rounds on the list of entries, wherein each convergence round attempts to converge values corresponding to the entries to an At Maximum Redundancy (AMR) state;
   performing a first convergence round by a first processing device on the list of entries; and
   scheduling a second convergence round for the first processing device to perform on the list of entries by selecting a wait time interval from the defined range of wait time intervals.

2. The method as recited in claim 1, wherein the wait time interval is selected by the first processing device at the end of the first convergence round.

3. The method as recited in claim 1, further comprising:
   executing, by the first processing device, a convergence step on a first value corresponding to a first entry on the list of entries; and
   if the convergence step does not converge the first value to an AMR state, then setting a step-wait time for starting a subsequent convergence step on the first value.

4. The method as recited in claim 3, further comprising:
   performing the second convergence round; and
   executing the subsequent convergence step on the first value during the second convergence round only if the step-wait time has expired.

5. The method as recited in claim 1, further comprising:
   executing by the first processing device, convergence steps on a first value corresponding to a first entry on the list of entries; and
   after each unsuccessful convergence step, increasing a maximum step-wait time for starting a subsequent convergence step on the first value, and selecting a step-wait time for the subsequent convergence step that is less than or equal to the increased maximum step-wait time.

6. The method as recited in claim 1, further comprising:
   encoding a first value into a plurality of fragments for storage across a first storage domain and a second storage domain remote from the first storage domain; and
   executing, at the first storage domain, a convergence step on the first value, wherein the executing comprises:
      determining, at the first storage domain, whether sibling fragments are missing from the second storage domain;
      if the sibling fragments are missing from the second storage domain, notifying the second storage domain of an intent to recover the missing sibling fragments at the first storage domain; and
      in response to the notification, delaying, at the second storage domain, execution of a corresponding convergence step on the first value.

7. The method as recited in claim 6, further comprising:
   recovering missing sibling fragments at the first storage domain; and
   transmitting only a sufficient number of missing sibling fragments to the second storage domain to allow the second storage domain to recover all sibling fragments missing from the second storage domain.

8. A distributed storage system, comprising:
   a local storage domain; and
   a remote storage domain in communication with the local storage domain via a network, each of the local and remote storage domains comprising:
      a fragment server having a plurality of storage devices to store encoded fragments corresponding to a plurality of values inserted into the distributed storage system, the fragment server configured to:
         perform a first round of convergence on values having fragments for storing on the fragment server's storage devices; and
         schedule a second round of convergence on values that did not achieve an At Maximum Redundancy (AMR) state in the first round of convergence, wherein the fragment server is configured to schedule the second round of convergence to start after a selected time interval from start of the first round of convergence.

9. The system as recited in claim 8, wherein the fragment server is configured to select the selected time interval from a range of time intervals, and wherein the fragment server is configured to perform the selection after conclusion of the first round of convergence.

10. The system as recited in claim 8, wherein the fragment server is further configured to:
    execute a convergence step on a first value corresponding to a first entry on a list of entries; and
    if the convergence step does not converge the first value to an AMR state, then set a step-wait time for starting a subsequent convergence step on the first value.

11. The system as recited in claim 10, wherein the fragment server is further configured to:
    start the second round of convergence; and
    execute the subsequent convergence step on the first value during the second round of convergence only if the step-wait time has expired.

12. The system as recited in claim 8, wherein the fragment server is further configured to:
    execute convergence steps on a first value; and
    after each unsuccessful convergence step, increase a maximum step-wait time for starting a subsequent convergence step on the first value, and select a step-wait time for the subsequent convergence step that is less than or equal to the increased maximum step-wait time.

13. The system as recited in claim 8, wherein the fragment server at the local storage domain is further configured to:
    execute a convergence step on a first value, wherein the executing comprises:
        determining whether fragments corresponding to the first value are missing from the fragment server at the remote storage domain; and
        if the fragments corresponding to the first value are missing from the fragment server at the remote storage domain, notifying the fragment server at the remote storage domain of an intent to recover the missing fragments at the local storage domain,
    wherein, in response to the notification, the fragment server at the remote storage domain is configured to delay execution of a corresponding convergence step on the first value.

14. The system as recited in claim 13, wherein, during the convergence step for the first value, the fragment server at the local storage domain is configured to:
    recover fragments corresponding to the first value; and
    transmit over the network to the remote storage domain only a sufficient number of fragments to allow the fragment server at the remote storage domain to recover missing fragments for the remote storage domain.

15. A distributed storage system, comprising:
    a first fragment server having a plurality of first storage devices to store encoded fragments corresponding to values inserted into the distributed storage system; and
    a second fragment server having a plurality of second storage devices to store encoded fragments corresponding to values inserted into the distributed storage system, the second fragment server in communication with the first fragment server via a network,
    wherein each of the first fragment server and the second fragment server is configured to execute respective convergence steps on a first value having encoded fragments assigned for storage on the first storage devices and the second storage devices, and
    wherein the second fragment server is configured to delay execution of its respective convergence step on the first value in response to notification that the first fragment server is executing its respective convergence step on the first value.

16. The system as recited in claim 15, wherein, while executing its respective convergence step on the first value, the first fragment server is configured to determine whether encoded fragments for the first value are missing from the second storage devices and, if the encoded fragments for the first value are missing from the second storage devices, recover the missing encoded fragments for the second storage devices.

17. The system as recited in claim 16, wherein, if the number of encoded fragments missing from the second storage devices exceeds the minimum number of fragments needed to recover the missing fragments, the first fragment server is configured to transmit to the second fragment server only the minimum number of recovered missing fragments.

18. The system as recited in claim 15, wherein if execution of its respective convergence step on the first value is unsuccessful, the first fragment server is configured to increase a delay time for executing a subsequent convergence step on the first value.

19. The system as recited in claim 18, wherein the first fragment server is configured to:
    maintain a list of values having fragments for storing on the first storage devices;
    execute a first convergence round on the list; and
    schedule a start of a second convergence round on the list by selecting a wait time between the first and second convergence rounds from a predefined range of wait times.

20. The system as recited in claim 19, wherein the first fragment server is configured to execute the subsequent convergence step on the first value during the second convergence round only if the delay time has expired.

* * * * *